Jan. 16, 1934.  W. D. FOSTER  1,944,026
CONTROL MECHANISM

Original Filed Sept. 19, 1925   3 Sheets-Sheet 1

INVENTOR.
WARREN DUNHAM FOSTER
Waldo G. Morse,
ATTORNEY.

Jan. 16, 1934.  W. D. FOSTER  1,944,026
CONTROL MECHANISM
Original Filed Sept. 19, 1925  3 Sheets-Sheet 2

INVENTOR.
WARREN DUNHAM FOSTER
Waldo G. Morse
ATTORNEY.

Patented Jan. 16, 1934

1,944,026

UNITED STATES PATENT OFFICE 1,944,026

CONTROL MECHANISM

Warren Dunham Foster, Washington Township, Bergen County, N. J., assignor to Kinatome Patents Corporation, a corporation of New York Original application September 19, 1925, Serial No. 57,392. Divided and this application March 4, 1932, Serial No. 596,884, and in Great Britain September 17, 1926

33 Claims. (Cl. 175—337)

The present invention relates to control means for apparatus and machines. This application is a division from my copending application Serial Number 57,392, filed September 19, 1925.

In certain types of machines wherein a plurality of different operative movements are necessary for the machine to perform its functions, speed and convenience are increased by providing means for controlling such machines which will insure that part or all of the operations of the machines will take place in a predetermined manner. It is an object of the present invention to provide an improved control mechanism which can control the operation of the operable parts of a machine by simple, easily performed movements of a single member to a plurality of operating stations.

It is a further object of the present invention to provide a control mechanism having relatively few control members which are so arranged for movement as to control a machine having a relatively large number of operable members to be controlled. A further object of the invention is to provide a control mechanism for a machine, which mechanism can be alternately operated by hand at will or by power automatically, upon predetermined operation of certain members of said machine.

Another object of the invention is the provision of improved solenoid-powered means for operating a control mechanism for a machine which means are automatically actuable for moving a control mechanism to a plurality of control positions by a plurality of solenoids so connected to the control mechanism that any solenoid can move the mechanism to a predetermined control position independently of the other solenoids.

A large proportion of all machines and apparatus used in modern times are driven by electric motors which are often operated continuously as long as any part of the driven machine is in operation. It is a further object of my invention to provide a control mechanism suitable for use with a machine driven by an electric motor which includes means for automatically slowing down the motor for a predetermined short or long period, while a certain operation of the machine is being performed in response to the control mechanism, or while the machine is performing a certain operation which it may be desirable for various reasons to carry out at a speed different from that of other operations.

In carrying out my invention as illustrated in the accompanying drawings, I mount a lever member for reciprocable angular movement about a pivot and slidably mount on such member a major control member for reciprocable longitudinal movement along said lever member and for angular movement therewith. The compound movement thus obtained for the control member not only increases the extent of its work field but also greatly facilitates the engagement and disengagement of the control member to and from secondary control members which are operatively connected with the machine members to be controlled.

According to one exemplification of my invention, transverse notches may be provided in the major control member which notches, because of the compound operative movement of said member, enable it to readily engage simple stub pins in auxiliary connecting control members and move these auxiliary members to predetermined operative work positions and then release them after these connecting members are engaged by releasable holding members. Other means can be employed for connecting and disconnecting the major control member and the auxiliary control members and for maintaining such members in predetermined positions and relations.

For operatively moving the control members, I may prefer to connect one end of the major control member to a rotatably mounted disc by a pin device, with provision for the manual operation of the control mechanism, preferably through such rotatable disc. To operate the control mechanism by powered means I prefer to employ a plurality of solenoids. Certain of these solenoids are positioned on one side of the disc and are constructed for acting oppositely to the remainder of these solenoids which are positioned on the opposite side of the disc. Power transmitting means are providing for connecting the cores of the solenoids on one side of the disc to the solenoid cores on the opposite side, and coacting with devices for rotating the disc. This organization includes means whereby energization of a solenoid on one side of the disc rotates the disc a predetermined amount and operates the control mechanism correspondingly, and subsequently positions the core or cores of the solenoids on the opposite side of the disc for full operative movements when their respective solenoids are energized. By this arrangement of a plurality of solenoids, the disc and the control member connected thereto may be moved to any of a plurality of control positions by energizing the proper solenoid. For automatic operation of the control mechanism, the energization of these solenoids can be secured by well-known means cooperating with suitable parts or work-pieces of the associated machine.

Another feature of my invention resides in the employment of an elongated common core member for use with two oppositely acting coaxial solenoids, thus reducing the number of parts and the manufacturing costs of the apparatus, affording an extremely compact mechanism, and decreasing the chances of connections working loose during the operation of said apparatus, which chances would be greater should two cores be used with a member connecting them. The importance of this feature will be appreciated when it is remembered that power is usually applied to a solenoid suddenly and where two oppositely acting solenoids are used, as in the present invention, the strain resulting from suddenly energizing one solenoid is partly transferred to the core of the opposite solenoid through the means connecting the cores.

Another feature of my invention resides in the provision of an improved timing device which is effective to control the speed of movement of my control mechanism by any of the solenoids connected therewith.

Another feature of my invention resides in a compact arrangement of the devices for connecting my primary control member with machine parts so that these connecting devices occupy but little space in the midst of the machine parts. In accordance with this feature, a rock shaft of one connecting device is disposed in a cylindrical tube of another connecting device, the rock shaft and the tube being separately movable angularly by the control member. The compound movements of my major control member facilitate the employment of separate thin sheet metal rock arms for the rock shaft and the tubing, which rock arms may be compactly disposed side by side to be separably engaged and released by the control member.

In the accompanying drawings forming a part of this specification, there is shown one exemplification of means for practicing my invention. It will be understood that means different from the structures of the drawings may be used without departing either from the spirit of my invention or scope of my broader claims.

It will be understood as the description proceeds that the structure of the present invention may be mounted in various ways on the machine or apparatus it is to control. In the present disclosure, my control mechanism is shown mounted in a hollow base 10 on which may be supported the apparatus to be controlled by the mechanism of my invention. It will be understood that the base 10 may be of any suitable shape and depth and support such frame members F and F' as may be required in connecting my mechanism to the apparatus.

The control mechanism of the present invention is well suited for manual operation alone or for automatic operation by apparatus with which it is associated, or for manual operation in part and automatic operation in part. To make more facile this dual operation of my control mechanism, the parts in base 10 may be connected by means hereinafter described with a single control knob or finger piece or button 11 designed to be grasped and manually moved along an arcuate slot 12 in the base 10 between a plurality of operating stations.

In the immediately following portion of this specification, I describe my control mechanism as operated manually. Later I describe electrical and automatic operation thereof.

For convenience I designate these stations in this application as in my parent application, S1, S2, S3, and S4. It will be understood as the description proceeds that a smaller or greater number of operating stations may be employed.

Figure 3:
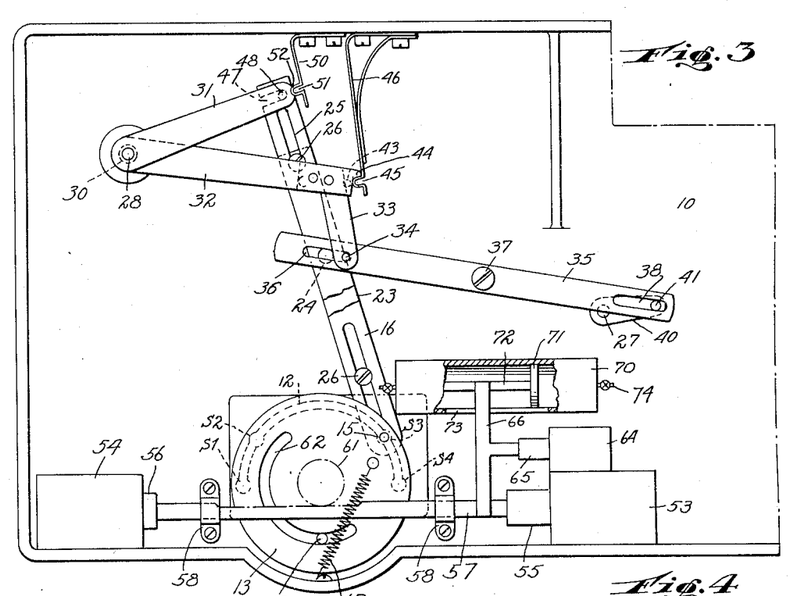
Figure 4:
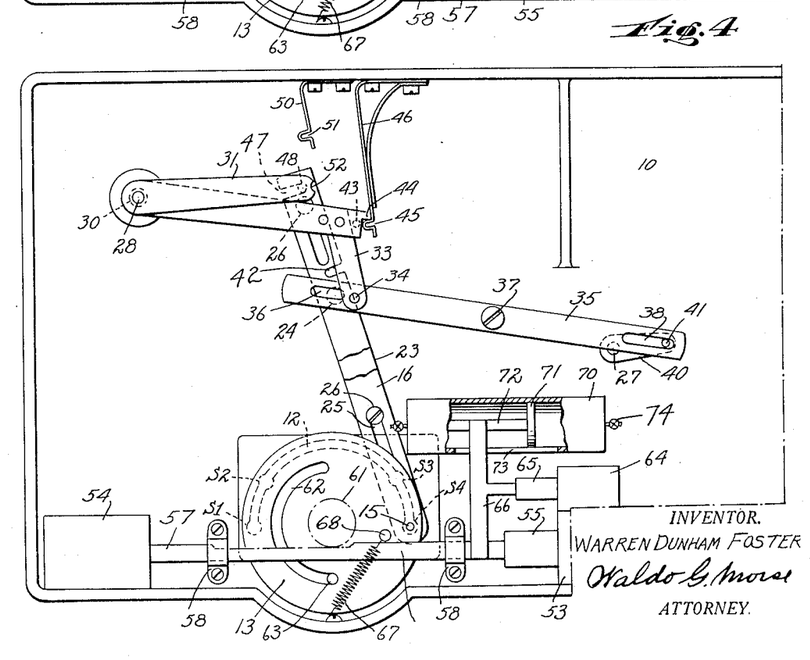
Figure 5:
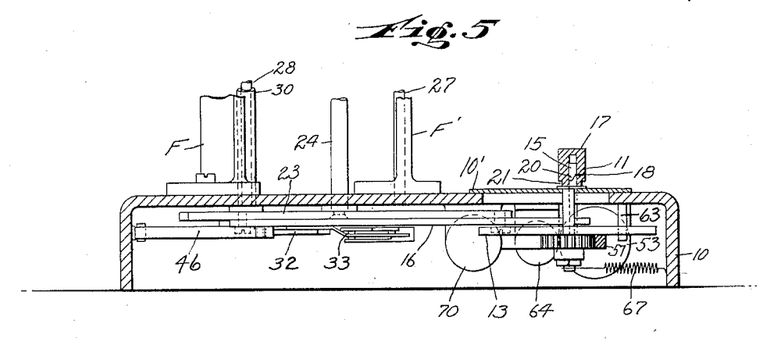
Figure 5 is a side view, broken away in part, of the structure shown in Figure 1.

As shown in Figures 1 to 4, one form of my control mechanism may include a disc 13 which may have a pivotal or rotative support 14 on the top of the base 10 or on a plate 10' which may be secured to the base over an opening therein (Figure 5). The disc 13 will be coaxial with the slot 12. This disc has secured thereto a stub pin 15 (Figure 5) which is mounted in one end of a lever 16 to be further described. The finger piece 11 has a head 17 provided with an inwardly projecting pin 18 arranged to engage in a bayonet type slot 20 but in the pin 15. By reason of this construction, it will be apparent that by a rotative movement of the finger piece 11 the latter may be moved vertically on pin 15, and may either occupy thereon an upper or lower operating position. At its lower end, the finger piece 11 has a collar 21 of a diameter to fit snugly in an enlarged circular portion 22 (Figure 1) of the slot 12 provided at each of the operating stations S1, S2, S3 and S4. With the finger piece 11 in its lower position, accidental movement from one of these stations is prevented, while with the finger piece in its upper position on pin 15 the mechanism to which the finger piece is connected is free for manual operation, or automatic operation independently of any operator, as will be presently explained.

The lever 16 may be slidably mounted on another lever 23 which is rigidly fastened on the lower end of a vertical rotatably mounted rock shaft 24 which may extend upwardly through the base 10 to be suitably connected with a machine part to be controlled. Adjacent each end of the lever 16, a lengthwise slot is provided therein and through each of these slots there projects a headed pin or shoulder screw 26. It will be noted that while the lever 23 is secured to the rock shaft 24 and is thus limited to angular movement, the lever 16 is mounted for movement angularly and longitudinally, which advantageous construction greatly increases the compactness and flexibility of my control mechanism and when employed in cooperation with other features of my invention, greatly increases the possible number and character of operative control connections which can be made between my control mechanism and various parts of the apparatus to be controlled. Also, this arrangement of the levers 16 and 23 facilitates the movement in desirable timed relation of certain parts of the apparatus to which they are connected.

For operatively connecting and disconnecting various parts of a control apparatus to and from a source of power, or moving such parts or otherwise affecting them for control purposes, I find it preferable, in many cases, operatively to connect my control mechanism to the controlled apparatus through a plurality of rock shafts and sleeves coaxial therewith which shafts and sleeves extend upwardly through the top of base 10. If desired, my control mechanism can be mounted on the top or side of a housing (not shown) which may enclose the apparatus to be controlled and the rock shafts and sleeves can extend downwardly or laterally into the housing in convenient position relative to the parts to be controlled. As can be readily seen by those skilled in power transmitting mechanisms, other machine elements can be used with the above described control shafts and sleeves or can replace them entirely.

In Figures 1 to 4, two such rock shafts 27 and 28 are illustrated in addition to the rock shaft 24. A sleeve or tube 30 surrounds the rock shaft 28. For predeterminedly rocking the shafts 27 and 28 and the sleeve 30 by movement of the disc 13 an arm 31 is fastened rigidly on the lower end portion of the shaft 28 and the rock arm 32 is rigidly fastened to the sleeve 30. To the outer end of the rock arm 32 may be fastened, as by riveting, an angular extension 33 in the outer end of which is fastened a stub pin 34. A lever 35 having a longitudinal elongated slot 36 is pivoted on a shoulder screw 37 so that the slot may engage the pin 34. For operatively connecting the other end (the right hand end as viewed in Figure 1) of the lever 35 with the rock shaft 27, a lengthwise slot 38 is provided in the end of the lever 35 and a rock arm 40 is fastened rigidly on the lower end of the shaft 27 and is provided with a stub pin 41 arranged for engaging with a loose fit in the slot 38.

I prefer operatively to connect the sliding lever 16 with the rock arm 32 by the following means: A crosswise slot 42 is provided in the lever 16 adjacent the lengthwise slot 25. An upwardly extending pin 43 is fastened securely in the rock arm 32 for engagement in slot 42 in the lever 16 which slot it will be noted has its open end extending to the right edge of the lever 16. There is also provided on the rock arm 32 a latching finger 44. The cooperation of the pin 43 and the slot 42 is as follows: When the finger piece 11 is moved from station S1 to station S2 or from the position shown in Figure 1 to that shown in Figure 2, the extension 33 and the arm 32 will be moved upwardly as viewed in such Figure 1 until the finger 44 engages with the latching detent element 45 integrally formed in a spring 46 which may be fastened in a well known way on the base 10. Immediately after the engagement of the finger 44 and the detent element 45 which takes place upon the arrival of the finger piece 11 at the station S2, further movement of the finger piece 11 toward station S3 will begin moving the slot 42 out of engagement with the pin 43 as will be understood by inspection of Figure 3. It will be noted that the movement of the arm 32 to position wherein it is locked by the detent 45 will have rocked the sleeve 30 counter-clockwise through a considerable angle.

To rock the arm 31 and the shaft 28 for control purposes the finger piece 11 may be moved from station S2 toward station S3 whereupon the upper end of the lever 16 as viewed in Figure 3 is swung to the left and is also moved toward the upper end of the base 10. By the time the finger piece 11 has reached station S3 an open leftwardly extending slot 47 provided in the outer end of the lever 16 will have been moved into position for engaging an upwardly extending pin 48 which is fastened securely in the outer end of the rock arm 31. The rock arm 31 is normally held in a work position for engagement of the pin 48 by the slot 47 by means of a spring 50 which may be fastened in a usual way on the base 10 and be formed with a detent element 51; a notch 52 being formed in the end of the arm 31 for engagement with the detent element 50.

Movement of the finger piece 11 from station S3 to station S4 will move the rock arm 31 and the rock shaft 28 clockwise as will be seen by inspection of Figure 4. In many cases, apparatus which is controlled by the mechanism of my invention will be disposed in a work condition by the movement of the finger piece 11 from station S1 around to station S4 wherein it will be desirable to have the apparatus operate for a time with its parts disposed in such positions as will result from moving the finger piece 11 from station S3 to station S4 and wherein certain parts connected with the sleeve 30 and the rock shaft 28 are not affected by this last portion of the control movement of the finger piece 11.

Movement of the finger piece 11 from station S4 back to station S1 which ordinarily will dispose the controlled apparatus in normal operating condition is effective to move the rock shafts 24, 27 and 28 and the sleeve 30 in the following sequence: Upon movement from S4 to S3 the arm 31 is moved back to its normal or Figure 3 position and is latched therein. This movement of the lever 16 is without effect on the rock arm 32 and the lever 35. Further travel of the finger piece 11 from station S3 toward station S2 is effective to disengage the lever 16 from the rock arm 31 and leaves the rock arm 32 and the lever 35 motionless for a time, but swings the rock shaft 24 clockwise, which shaft was not perceptibly moved by the travel from S4 to S3. During the latter part of the travel of the lever 16 from its S3 position to its S2 position it begins to reengage the notch 42 with the pin 43, and when the finger piece 11 has arrived at the station S2 the lever 16 is securely connected to the rock arm 32 by means of the notch 42 and the pin 43. During the final travel of the finger piece 11 from station S2 to station S1 the arm 32 is pulled free of the detent spring 46 and is swung clockwise together with the sleeve 30. This movement of the rock arm 32 swings the extension 33 and the lever 35 with it, and the arm 40 and the rock shaft 27 are returned by counter-clockwise movement of the lever 35 to the Figure 1 position. This leaves the parts of the apparatus in the same position they were in when the operation of the control mechanism began.

It will be noted that by the provision of the elongated slots 36 and 38 for engagement with the pins 34 and 41 respectively that the movement of the rock shaft 27 may be controlled so that it lags behind the other moving parts. In other words, the rock shaft 27 may begin to move a predetermined time after the initial operation of the control mechanism or at once, and it may be returned to normal operative position after all the other moving parts controlled by the control mechanism have been returned to their normal position. This feature of my control mechanism will be found very desirable in certain kinds of apparatus.

In order that my control mechanism may be operated automatically by the apparatus or machine which it controls I provide means for moving the disc 13 predeterminedly, and independently of an operator. One form of such means may include two oppositely acting solenoids 53 and 54. These solenoids will preferably be placed one on each side of the disc 13 and the core elements 55 and 56 of the solenoids may be formed integrally with each other and include the section 57, thus providing a common core for both windings, or the element 57 may be constructed of different material.

One advantage of my construction results from the disposition of magnetizable metal, ready to be acted upon by that part of the field of the solenoids which extends considerably inwardly therefrom beyond the ends of the windings. Thus by making the core elements 55 and 56 of the same piece of metal and by disposing some of such metal beyond the ends of the windings and within the extension of the magnetic field much of which is ordinarily wasted, I secure a much greater pulling force from a given amount of space and metal than would be the case if the cores were joined by a piece of nonmagnetic material.

For guiding the element 57, two guide members 58 may be fastened to the base 10 in any suitable way. For operatively connecting the element 57 with the disc 13 a rack may be provided on the element 57 by having rack teeth 60 cut therein, or if preferred, the teeth 60 may be cut in a separate piece of harder metal which may be fastened on the bar 57. To cooperate with the teeth 60 the pinion 61 may be rotatably mounted on the support 14 coaxial with the disc 13 and connected therewith.

To connect the disc 13 with the lever 16 the pin 15 in the lever extends downwardly through an oversized hole in the disc 13. Before the initiation of operation of the control mechanism by solenoids 53 and 54, the finger piece 11 will be held in its upper position by the means described above. When the core element 55 is sucked into the solenoid 53 as shown in Figure 1, it will be effective through the rack teeth 60 and the pinion 61 to move the disc 13 and the lever 16 to the Figure 1 position.

Figure 1:
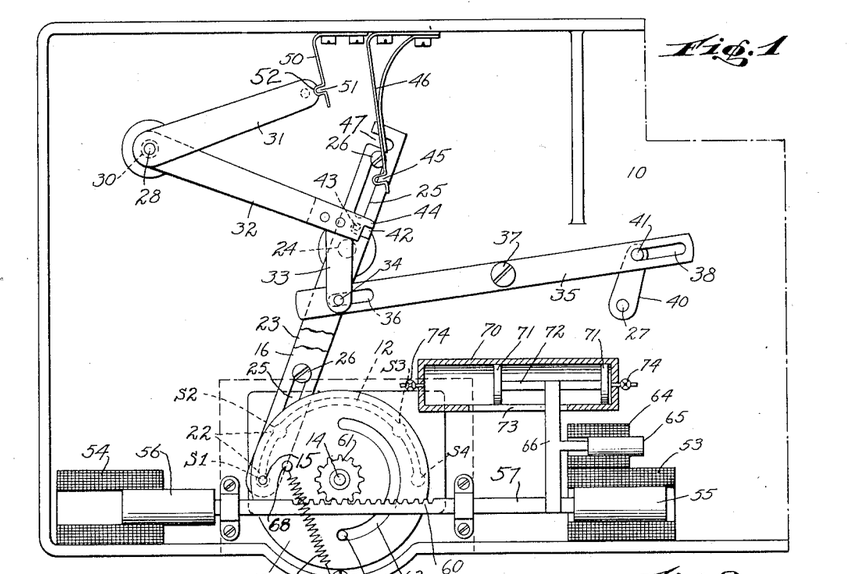
Figure 1 is a bottom view looking up, broken away in part, of my control mechanism when mounted in a hollow base member of a machine to be controlled.

To insure that the disc is stopped accurately in the Figure 1 position, a circumferential slot 62 is provided in the disc 13 and a pin 63 is fastened in the base 10 to engage in slot 62. Each end of the slot is rounded, and one end is positioned so that it comes up against the pin 63 when the pin 15 is at the S1 station. When the solenoid 54 is energized it sucks, i. e. pulls, its core element to the left and the rack teeth move the pinion 61 and the disc 13 clockwise until the other end of the slot 62 is stopped against the pin 63 (see Figure 4). It will be noted that the operative movement of the core elements of the solenoids 53 and 54 move the disc 13 and lever 16 all the way between station S1 and station S4, and between station S4 and station S1 respectively.

Figure 2:
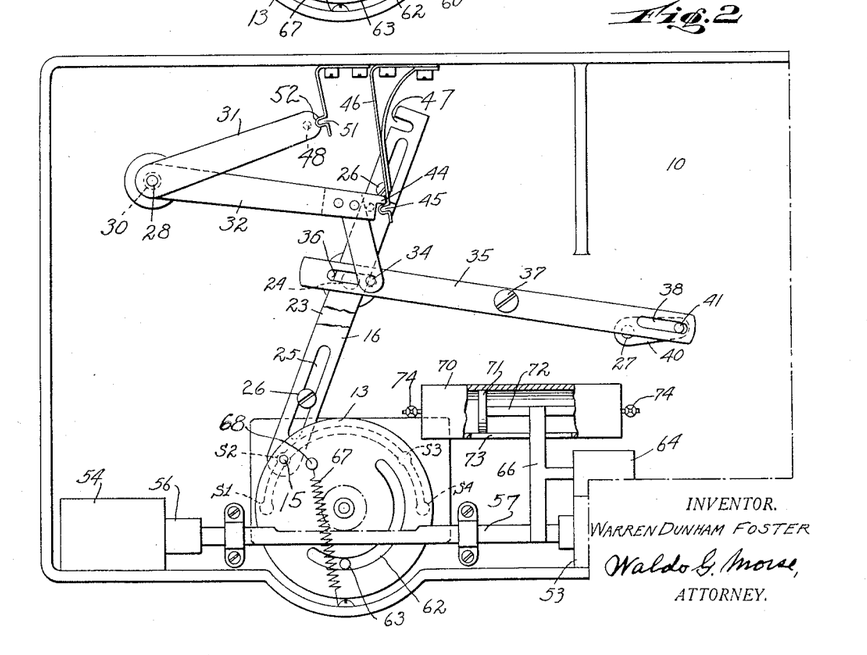
Figures 2, 3 and 4 are operational views of my control mechanism which are similar to Figure 1 and which illustrate different operative positions in which the members of my control mechanism may be disposed when the actuating control member is disposed at three different control stations respectively.

It is a feature of the present invention to provide simple positive means for moving the lever 16 to any desired one of the intermediate stations S2 or S3. In accordance with this feature, an auxiliary solenoid 64 is provided and may be mounted over the solenoid 63 and have a core 65 connected to an arm member 66 connected to the bar 57. As illustrated in the drawings, the windings of the solenoid 64 and the length of the core 65 are so arranged that when the solenoid 64 is energized the disc 13 will be revolved sufficiently to bring the pin 15 and the lever 16 to the S2 position as shown in Figure 2. It can be seen by inspection of Figures 3 and 4 that when the pin 15 and lever 16 are disposed at stations S1, S4 or station S3 the energization of the solenoid 64 will be effective to move the lever 16 to the S2 position as illustrated in Figure 2. In cases where it is desired to stop the lever 16 at other intermediate points between station S1 and station S4, additional auxiliary solenoids or a plurality of additional solenoids arranged on each side of the disc 13 similarly to the solenoid 64 and connected in a suitable way to the rack bar 57 may be provided.

It is contemplated that in most cases the apparatus controlled by my invention will have its parts disposed in an operative position by a movement of the lever 16 to the S1 station or position. Ordinarily the parts of the apparatus will be held in such operating positions for a considerable period of time. With certain kinds of apparatus it is often desirable to run some of the parts backwardly for a suitable period of time as when rewinding work pieces or strips. When my control mechanism is used with the last named kind of apparatus it is considered desirable to have the parts to be controlled so connected to my mechanism that when the lever 16 is in the S4 position such parts will be operatively connected with a suitable source of power to be reversely operated. For making my mechanism more positive in controlling apparatus for this contemplated use, it is desirable to provide means which will hold the lever 16 positively in either of its extreme positions, i. e. S1 or S4. Such means are particularly desirable for holding the mechanism in the S1 or S4 position in cases in which it is desired to de-energize the circuits of the windings after the solenoids have moved the control mechanism to such positions. Such means may be provided in the form of an extensile spring 67, one end of which is fastened to the base 10 at a point opposite the axis of the disc 13 and the other end to a pin 68 fastened in the disc 13 at one side of a line through the axis of the disc 14 and the fixed end of the spring. As is shown in Figure 1, the spring 67 functions to pull the disc 13 against the pin 63 and hold the lever 16 in S1 position positively against accidental misplacement. In like manner the spring will hold the lever 16 positively in its S4 position as shown in Figure 4.

The spring 67 also has another function. When the solenoid 64 is energized it moves the lever 16 to the S2 position as mentioned above.

Then when the solenoid 64 is deenergized the spring 67 becomes effective to move the lever 16 back to station S1. Also, should the lever 16 be moved either by manual operation or by an auxiliary solenoid (not shown) to station S3 the spring 67 will be effective to move the disc 13 to station S4 when the solenoid is de-energized or when the hand of the operator is removed. Since in most cases it is not desirable to have the lever 16 inadvertently left in any of the intermediate stations for any length of time the spring 67 serves as a safeguard against the carelessness of an operator leaving the control mechanism wherein its parts are not disposed in either or two main work positions, i. e. S1 or S4.

When used with certain kinds of apparatus it is desirable to provide my control mechanism with means which will time the speed of certain control operations so that they may be made in exact timed relation to the operation of other parts associated therewith. One form of such means comprises a double action dash pot device which includes the cylinder 70 having two pistons 71 connected by a bar 72 to which is fastened the member 66, the latter extending into the cylinder through a lengthwise slot 73 as shown in Figure 1. Each end of the cylinder 70 may be provided with well-known types of air valves 74 and movement of the piston 71 by the energization of any of the solenoids will be resisted in a well-known way by the air that is forced through the valves 74. It will be noted that the slot 73 is so arranged that the timing device described above will not begin to function during the initial part of the movement of the rack bar 57 in either direction because of the energization of a solenoid. This construction is very desirable since it permits a quick initial movement of the control mechanism and certain connected parts of the associated apparatus, and then causes the final movement of such parts and other parts subsequently connected to the control mechanism to be made in a more gradual manner.

My control mechanism is thus well suited for controlling devices which effect the operation of electric switches which it is very desirable to open and close quickly. Also, this characteristic is useful in connection with the operation of many types of clutches which should be operated quickly while other related operations can best be initiated or carried out gradually.

Figure 6:
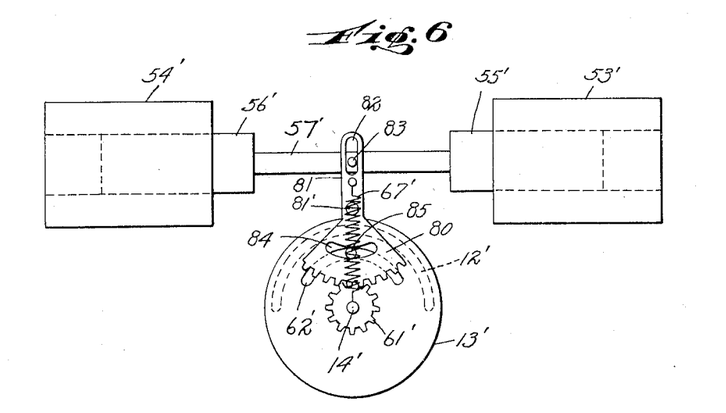
Figure 6 is a diagrammatic side view of another arrangement of the oppositely acting solenoids of my invention for coaction with other parts of my apparatus which is different from the organization of parts shown in Figure 1.

In Figure 6 there is illustrated a modified arrangement of two oppositely acting solenoids 53′ and 54′ which have core elements 55′ and 56′ respectively. These cores are connected preferably by an integral bar member 57′ so that both cores and the bar member can be made from a single piece of stock.

To connect the member 57′ to a disc 13′ which may have substantially the same functions as disc 13 described above, the disc may be mounted on an axle 14′ on which a pinion 61′ is also mounted and a connection between the portion 57′ of the common core of the solenoids and the pinion 61′ is provided in the form of an arcuate rack 80. This rack may be pivoted on a pin 81′ and be formed with an elongated slot 82 in an upwardly extending arm 81 so that a pin 83 fastened in the portion 57′ of the common core of the solenoids engages in the slot 82.

It can be seen from the above description that when, for example, solenoid 53′ is energized the disc 13′ will be rotated counter clockwise and when the solenoid 54′ is energized the disc 13′ will be rotated clockwise. To limit the amount of rotation of the disc 13′, it is formed with a curved slot 62′ in which engages a pin 85 fastened in the frame of the machine (not shown) with which the structure of Figure 6 is to be used. A spring 67′ having one end fastened to a pin in the upwardly extending arm 81 of the arcuate rack 80 and the other end fastened to the axle 14′ will function as the spring 67 of Figure 1. A manually movable finger piece (not shown) may be carried by the disc 13′ to be moved along a work path 12′, which will have operating stations (not shown) which may be similar to the operating stations S1, S2, etc., of Figure 1.

Figure 7:
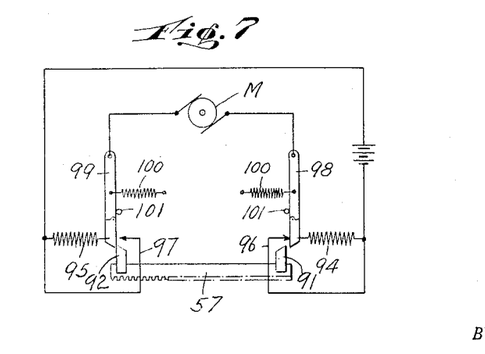
Figure 7 is a diagrammatic view illustrating how my control mechanism functions for controlling the circuit of an electric motor which drives the machine which my mechanism controls.

In Figure 7 is illustrated an important feature of my invention which resides in the arrangement of means for coaction with the central core member 57 for changing the speed of an electric motor M which will preferably be used for driving the machine of which the base 10 forms a part. Such means may include a plurality of trip fingers 91 and 92 which are mounted in a suitable way on the member 57 for adjustment therealong. These fingers are so positioned that movement of the bar 57 in either direction by any of the solenoids 53, 54 or 64, or by manual operation of my control mechanism, will cause the upper beveled end portion of one of the fingers, which may be made of electrical non-conducting material, to engage the lower beveled end of one of two switch members 98 and 99 which may be pivotally mounted at their upper ends so as to swing outwardly when engaged by the fingers. The switch members 98 and 99 will preferably be connected in series in the circuit of the motor M which circuit passes through the member 98 and from the same through a yielding contact terminal of well known construction which it is not thought necessary to describe for an understanding of this invention, to a stretch of electric conductor 96 leading to a suitable source of electric current. From this source of current, a conductor 97 leads to a terminal which is normally in contact with the lower end of the switch member 99. Springs 100 hold the switch members 98 and 99 in normal work position against stationary stop members 101. A suitable length of resistance wire 94 is connected between the switch member 98 and the conductor 96 so as to form a shunt circuit around the switching means consisting of the lower portion of the member 98 and the contact terminal of the conductor 96. A length of resistance wire 95 forms a shunt around the adjacent switching means including the lower portion of the member 99 and the contact terminal of the conductor 97 in a similar way as described above for the resistance 94. It will be understood though that the ohmage of the resistance 94 may be different from that of the resistance 95.

The speed changing means shown in Figure 7 may be operated, for example, as follows: The trip finger 92 may be positioned on the member 57 so that when it is moved upon energization of the solenoid 64 it swings the member 99 just out of engagement with the terminal of the conductor 97 thus compelling the current in the motor circuit to flow through the resistance 95 which will thus slow down the motor as long as the solenoid 64 remains energized. Further movement of the member 57 to the left as for example under the influence of the solenoid 54 will cause the finger 92 to swing the member 99 up enough to pass under it whereupon the bar will be pulled to the right by the spring 100 against the stop member 101 and current to the motor M will flow around the resistance 95 and the speed of the motor will increase to normal. Return movement of the member 57 and the finger 92 to the right will not affect the motor M since the lower portion of the switch member 99 is pivotally fastened to the upper portion of this member below the stop member 101 so that the lower portion may be swung enough to the right to be raised sufficiently to let the trip finger 92 pass under it. During this rightward movement of the lower portion of the member 99 the yielding terminal of the conductor 97 may move rightwardly with the lower portion of the member 99 or the contact terminal may be positioned to engage the member 99 above the stop member 101.

With the member 57 in normal starting position and the motor M disconnected from the machine associated with my control mechanism, two trip fingers on the member 57 will ordinarily be disposed, one adjacent each of the switch members 98 and 99 so that a small initial movement of the member 57 in either direction will cut in additional resistance in the motor circuit. Additional movement of the member 57 will remove such resistance from the motor circuit. Thus the great advantage of slow starting and stopping is simply secured. It is to be understood that in many cases other trip fingers besides the two mentioned above in this paragraph may be advantageously employed and will be mounted at suitable points on the member 57.

Electric circuits for such solenoids as are employed in practising my invention as explained above may be advantageously operated in some cases by such means as are described in the parent application, and in other cases by suitable circuit closing and opening devices operatively connected with the machine to be controlled; many such circuit operating devices being in common use.

The control mechanism disclosed in this application may be advantageously applied, for example, to apparatus and machines of the kind shown in the parent application; in two co-pending applications of Warren Dunham Foster and Earle L. Parmelee, Serial Number 105,159, filed April 28, 1926, and Serial Number 587,392, filed January 18, 1932; in the co-pending application of Warren Dunham Foster and Frederick D. Sweet, Serial Number 352,525, filed April 4, 1929; in United States patents numbered 1,698,362 and 1,743,196, issued January 8, 1929 and January 14, 1930, respectively, to Peter J. Dugan. Also control mechanisms according to my invention are well suited for application to many machines during the operation of which it is required that certain moving parts be often stopped and started again in a predetermined manner.

Besides the advantages of my invention mentioned hereinbefore, additional advantages arise from the novel organization of short pull solenoids in conjunction with long pull solenoids for differentially moving control members.

Other advantages arise from the employment of a plurality of solenoids of different operative movement on either or both sides of an angularly movable control member, the solenoids on one side acting oppositely from the solenoids on the other side.

Other advantages arise from my provision of means for permitting quick initial operative movement of a solenoid-powered control mechanism and thereafter causing the remainder of the operative movement to be made at a slower speed.

Other advantages arise from my organization of devices operated by oppositely acting solenoids for changing the speed of a motor temporarily or for a longer predetermined period of time. Still other advantages arise from the employment of such an organization for predeterminedly controlling the circuit of any desired electric means.

I claim:

1. In combination, a solenoid comprising solenoid windings and a core adapted to movement therewithin, and means for controlling such movement, said means comprising a fluid-enclosing cylinder with a substantial portion of the wall thereof removed, a vent in an end relatively remote from such portion, a plunger adapted for travel within said cylinder, and a connection between said core and said plunger whereby the first portion of the travel of said plunger within said cylinder is without effect upon said core because of the removal of such portion of the wall and the succeeding portion of such travel retards such movement of said core by the cushioning effect of the fluid enclosed within said cylinder as it slowly escapes through said vent.

2. In combination, two solenoids, each of said solenoids comprising a solenoid winding and a core member movable therewithin, a connection between said core members, and means associated with said connection for retarding the movement of said connection in either direction, said means comprising a fluid-enclosing cylinder formed with a vent in each end, a relatively large central opening in the wall of said cylinder, a plunger adapted to movement within said cylinder and toward each end thereof, and means passing through said opening and connecting said plunger and said connection, whereby the primary portion of the movement of said connection in either direction, under the influence of said solenoid, is not affected by the operation of said plunger within said cylinder while the concluding portion of each such movement is retarded by the pressure of the fluid engaged by said plunger within said cylinder and escaping through said vent.

3. Operating mechanism comprising two oppositely acting solenoids, each thereof comprising a solenoid winding and a core movable therewithin, a member connecting said cores, whereby the passage of electricity alternately through said windings reciprocates said member, a third solenoid comprising a solenoid winding and a core, means connecting said third mentioned core and said member whereby said third mentioned solenoid also operates said member, said third mentioned solenoid being so constructed that the extent of movement of said member by either of said other mentioned solenoids is different from the movement by said third mentioned solenoid, means for cushioning said movement of said member in either direction, said means comprising a double acting dash pot with a central portion of the cylinder removed, and a connection between said member and said dash pot, whereby the movement of said member by said third mentioned solenoid is not retarded by said dash pot and the movement of said member by either of said other mentioned solenoids is retarded by said dash pot.

4. A pinion and operating mechanism therefor, said mechanism comprising two solenoids, each solenoid comprising a solenoid winding and a core movable relatively thereto, a member connecting said cores, a pinion, an arcuate segmental rack engaging said pinion and operatively connected to said member, whereby the movement of said member in one direction, following the actuation of the winding of one of said solenoids, rotates said pinion in one direction, and the movement of said member in the opposite direction, following the actuation of the winding of the other of said solenoids, rotates said pinion in the opposite direction, and spring means arranged to cooperate with each of said solenoids to help move said rack through the latter part of its travel in either direction.

5. In combination, a pair of oppositely acting solenoids, a core for each solenoid, a member connecting said cores, means coacting with said cores for regulating the speed of movement of said cores in either direction, said means including a fluid chamber having a longitudinal opening intermediate its ends and being disposed parallel to said connecting member and spaced therefrom, and devices movable in either direction in said chamber and extending through said opening to be secured to said core-connecting member.

6. In a control mechanism for a machine, in combination, a first control member mounted for angular movement, a second control member mounted on said first member for longitudinal movement along said first member, means for connecting said second control member to operable parts of the machine which are to be controlled, means for manually moving said first control member along a work path so that both angular and longitudinal movement of said second member is secured, and electrically operable devices associated with said machine for moving said first member a predetermined distance along said work path.

7. A control mechanism for a machine having a plurality of operable members to be controlled, said control mechanism including a first member mounted for angular movement, a second control member slidably mounted on said first member for reciprocatory longitudinal movement therealong and angular movement therewith, means connecting said second member with a plurality of the operable members of said machine, a first solenoid, a second solenoid acting oppositely from said first solenoid, said solenoids being coaxially disposed on opposite sides of said second control member, powered means for operatively moving said second control member including a rotatably mounted disc, devices fastening one end of second control member to said disc adjacent its periphery, and devices connecting said disc and said solenoids so that energization of the first solenoid will rotate said disc in one direction and energization of the second solenoid will rotate said disc in the opposite direction.

8. In a control mechanism for a machine to be automatically controlled, a control member, means for mounting said control member for angular and longitudinal movement, said control member being movable to a plurality of control positions, means effective at said control positions for operatively connecting said control member with the parts of said machine which are to be controlled, mechanism connected to said control member for moving it to and from each of said control positions, a first solenoid connected to said mechanism for moving said control member in one direction angularly through its full range of operative movement, a second solenoid connected to said mechanism for moving said control member in the opposite direction angularly through its full range of operative movement, and an auxiliary solenoid connected to said mechanism for predeterminedly moving said control member to one of said control positions.

9. In a control mechanism for a machine having a plurality of operable parts to be controlled, in combination, a first control member mounted for angular movement, a second control member having open transversely disposed notches intermediate its ends and being slidably mounted on said first control member to have both angular and longitudinal movement in its work field, movable devices each of which extends from a connection with the parts of said machine into the work field of said second control member, power driven means for moving said second control member to bring one of said notches into operative engagement with one of said connecting devices and moving the same for controlling the machine member connected therewith, and thereafter releasing said second control member from said connecting device, and subsequently moving said control member to bring another of said notches into engagement with another of said connecting devices, and operatively moving said last named connecting device.

10. In a control mechanism, in combination, a rotatably mounted disc, a control device including a reciprocable member having one end pivotally connected to said disc adjacent its circumference, a solenoid positioned on one side of said disc, a second oppositely acting solenoid positioned on the other side of said disc, cores for said solenoid, a device connecting said solenoid and said disc so that energization of said first solenoid will move said control member from a first work position to a second work position and energization of the second solenoid will move said control member from said second work position to said first work position.

11. In a control mechanism for a machine, in combination, a rotatably mounted disc, a control device including a movable member having one end pivotally connected to said disc adjacent its circumference and being connected to a portion of the machine to be controlled, means normally holding said control member either in a first position at the end of its work movement in one direction or in another position at the other end of its work movement in the opposite direction, a solenoid positioned at one side of said disc, a second oppositely acting solenoid positioned on the other side of said disc, cores for said solenoids, a device connecting said cores and said disc so that energization of said first solenoid will move said control member from said first work position to said second work position, and energization of said second solenoid will move said control member from said second position to said first position.

12. Operating mechanism for imparting alternate motion of a different extent in opposite directions, including a first solenoid, a second and oppositely acting solenoid having a core the full operative movement of which is different from the full operative movement of the core of said first solenoid, and devices connecting the cores of said solenoids.

13. Operating means for a control mechanism including a first solenoid having a movable core, a second oppositely acting solenoid having a core, the operative movement of which is less than that of the core of the said first solenoid, means connecting said cores, including a device angularly movable in relation to said solenoid, and a spring coacting with said device for moving it an additional amount in the same direction as it was moved by said second solenoid after the same has been deenergized, the total angular movement of said device by said second solenoid and said spring being equal to the angular movement of said device by said first solenoid.

14. In a control mechanism for a machine comprising a plurality of operable parts, in combination, a control member, powered means for moving said control member both longitudinally and angularly, said means including two oppositely acting solenoids and instrumentalities connecting said solenoids and said member, and means operatively connecting said control means with some of said machine parts upon predetermined longitudinal movement of said control member and for connecting said control member with other of said machine parts upon predetermined angular movement of said control member.

15. A reciprocable member and mechanism for reciprocably moving said member including a revoluble disc and a coaxial pinion attached thereto, a pair of oppositely acting windings, an armature member common to both windings whereby upon the passage of an electrical current through one of said windings said armature is moved in one direction and upon the passage of an electrical current through the other of said windings said armature member is moved in the opposite direction, a toothed connection between said pinion and said armature member, a pivotal connection for one of said reciprocable members on said disc so that upon the movement of said armature member in one direction said member is moved in one direction and upon the movement of said armature member in the opposite direction said reciprocable member is moved in the direction opposite that in which it was previously moved.

16. In combination, two oppositely acting solenoids each comprising a winding, a core movable in either direction by said windings, and pneumatic means controlled by said cores for cushioning the movement in either direction of each of said core relative to said winding, said cushioning means including devices rendering said cushioning means ineffective upon the movement of said core during a predetermined definite extent of initial movement in either direction relative to said winding, said means thereafter becoming automatically effective for retarding said core during the concluding portion of such movement.

17. In a control mechanism, a first control member movable about a pivot, a second control member slidable on said first control member lengthwise thereof, electro-magnetic means operable for moving said second control member angularly and bodily to a plurality of control stations, and means for controlling the rate of movement of said second control member by said operable means.

18. In a control mechanism, a first control member movable about a pivot, a second control member slidable on said first control member lengthwise thereof, operable means for moving said second control member angularly and bodily to a plurality of predetermined control stations, and a prime mover for operating said moving means.

19. In a control mechanism, in combination, a first control member movable about a pivot, a second control member slidable along said first control member lengthwise thereof, and operable means for predeterminedly moving said second control member angularly and bodily to a plurality of control stations.

20. In a control mechanism, a first control member movable about a pivot, a second control member slidable along said first control member lengthwise thereof, operable means for bodily moving said second control member, clockwise or counterclockwise, to a plurality of predetermined control stations, and electrically actuated means for operating said moving means.

21. In a control mechanism, a first control member movable about a pivot, a second control member slidable along said first control member lengthwise thereof, operable means for moving said second control member clockwise or counterclockwise and concomitantly moving it lengthwise of said first control member in either direction, the direction of the lengthwise movement of said second control member being in predetermined relation to the clockwise or counterclockwise movement thereof.

22. In a control mechanism, a first control member movable about a pivot, a second control member slidable along said first control member lengthwise thereof, a plurality of auxiliary control member whereby to move said auxiliary control said second control member predeterminedly to said auxiliary control members, and means for thereafter operatively moving said second control member whereby to move said auxiliary control members predeterminedly.

23. The structure described in claim 22, characterized by means for moving said auxiliary control members to predetermined control stations by said second control member, and further characterized by means for detaining said auxiliary control members in said predetermined control stations.

24. The structure described in claim 22, characterized by means for moving said auxiliary control members to predetermined control stations by action of said second control member, and further characterized by means for detaining said auxiliary control members in said predetermined control stations, and means for releasing said second control member from said auxiliary control members when the same are positioned in their respective control stations.

25. A pinion and operating mechanism therefor, said mechanism comprising two solenoids. each solenoid comprising a solenoid winding and a core movable relatively thereto, a member connecting said cores, a pinion, an arcuate segmental rack engaging said pinion and operatively connected to said member, whereby the movement of said member in one direction, following the actuation of the winding of one of said solenoids, rotates said pinion in one direction, and the movement of said member in the opposite direction, following the actuation of the winding of the other of said solenoids, rotates said pinion in the opposite direction and spring means arranged to cooperate with each of said solenoids to help move said rack through the latter part of its travel in either direction, said spring means including an extensile spring connected to the pivot of said pinion and to said segmental rack at a point on a line through said pinion pivot and the axis of said rack.

26. In combination, a pair of oppositely acting solenoids, a core for each solenoid, a member connecting said cores, means coacting with said cores for regulating the speed of movement of said cores in either direction, said means including a fluid chamber having an opening intermediate its ends, said chamber being disposed parallel to said connecting member and spaced therefrom, devices movable in said chamber and extending through said opening to be secured to said core-connecting member, and a third solenoid operatively connected to said core-connecting member and operatively connected to said speed regulating means, said third solenoid being effective to move said core-connecting member independently of either of said pair of solenoids.

27. The structure described in claim 26, characterized by said third solenoid being effective to operatively move said core-connecting member a distance different from the operative movement thereof by either of said pair of solenoids.

28. In combination, a pair of oppositely acting solenoids, a core for each solenoid, a member connecting said cores, means coacting with said cores for regulating the speed of movement of said cores in either direction, said means including a fluid chamber having an opening intermediate its ends, said chamber being disposed parallel to said connecting member and spaced therefrom, devices movable in said chamber and extending through said opening to be secured to said core-connecting member, and a third solenoid operatively connected to said core-connecting member and operatively connected to said speed regulating means, said third solenoid being effective to move said core-connecting member independently of either of said pair of solenoids in either direction.

29. In combination, a first solenoid, a second solenoid coaxially disposed to said first solenoid and oppositely acting relatively thereto, cores for said solenoids, a connecting member for the cores of said solenoids movable thereby over a work path in either direction, a third solenoid having its axis parallel to said work path, a core for said third solenoid, and a connection between said last mentioned core and said connecting member, said last mentioned core and said connecting member being so arranged that said third solenoid is effective for moving said connecting member over its path in either direction.

30. In combination, a first solenoid, a second solenoid coaxially disposed to said first solenoid and oppositely acting relatively thereto, cores for said solenoids, a connecting member for the cores of said solenoids movable thereby over a work path in either direction, a third solenoid having its axis parallel to said work path, a core for said third solenoid, and a connection between said last mentioned core and said connecting member, said last mentioned core and said connecting member being so arranged that said third solenoid is effective for moving said connecting member over its path in either direction, said third solenoid being constructed to move said connecting member in either direction a distance shorter than the distance it is moved by said first or said second solenoid 31. The structure described in claim 30 having means effective for moving said connecting member along its path a distance additional to the distance said connecting member is moved by said third solenoid 32. In combination, a first solenoid, a second solenoid coaxially disposed to said first solenoid and oppositely acting relatively thereto, cores for said solenoids, a connecting member for the cores of said solenoids movable thereby over a work path in either direction, said first and said second solenoids moving said connecting member equal distances, a third solenoid having its axis parallel to said work path, a core for said third solenoid, a connection between said last named core and said connecting member, said third solenoid being constructed to move said connecting member a distance shorter than the distance it is moved by said first solenoid or said second solenoid, means effective for moving said connecting member along its path in either direction a distance additional to the distance said member is moved by said third solenoid, said moving means and said shorter solenoid being arranged to cooperate for moving said connecting member in either direction a distance not less than the distance said connecting member is moved by either said first or said second solenoid.

33. The structure described in claim 32 characterized by said moving means including rack teeth carried by said connecting member, a pinion engaging said rack teeth, and a spring powered over-center-throw device for rotating said pinion.

WARREN DUNHAM FOSTER.